United States Patent
Lyatkher

(10) Patent No.: US 10,451,040 B2
(45) Date of Patent: Oct. 22, 2019

(54) ORTHOGONAL TURBINE WITH PRESSURE-DIFFERENTIAL-CONTROLLED JETS

(71) Applicant: Victor M. Lyatkher, Richmond Heights, OH (US)

(72) Inventor: Victor M. Lyatkher, Richmond Heights, OH (US)

(73) Assignee: Ziaur Rahman, Dhaka (BD)

( * ) Notice: Subject to any disclaimer, the term of this patent is extended or adjusted under 35 U.S.C. 154(b) by 327 days.

(21) Appl. No.: 15/445,942

(22) Filed: Feb. 28, 2017

(65) Prior Publication Data

US 2018/0245569 A1  Aug. 30, 2018

(51) Int. Cl.
*F03D 7/06* (2006.01)
*F03B 17/06* (2006.01)
*F03D 3/06* (2006.01)

(52) U.S. Cl.
CPC .............. *F03D 7/06* (2013.01); *F03B 17/062* (2013.01); *F03D 3/062* (2013.01); *F05B 2210/16* (2013.01); *F05B 2220/32* (2013.01); *F05B 2220/706* (2013.01); *F05B 2240/211* (2013.01); *F05B 2240/2212* (2013.01); *F05B 2240/30* (2013.01); *F05B 2250/25* (2013.01); *F05B 2260/97* (2013.01); *F05B 2270/324* (2013.01); *Y02E 10/28* (2013.01); *Y02E 10/74* (2013.01)

(58) Field of Classification Search
CPC .......... F03D 7/06; F03D 3/062; F03B 17/062; F05B 2210/16; F05B 2220/32; F05B 2220/706; F05B 2240/211; F05B 2240/2212; F05B 2240/30; F05B 2250/25; F05B 2260/97; F05B 2270/324
See application file for complete search history.

(56) References Cited

U.S. PATENT DOCUMENTS

| | | | | |
|---|---|---|---|---|
| 2010/0014970 | A1* | 1/2010 | Bove | F03D 1/0633 416/1 |
| 2012/0045329 | A1* | 2/2012 | Smith | H02P 9/04 416/1 |
| 2012/0306215 | A1* | 12/2012 | Wesby | F03D 3/005 290/55 |

* cited by examiner

*Primary Examiner* — Syed O Hasan
(74) *Attorney, Agent, or Firm* — Lowe Graham Jones PLLC

(57) ABSTRACT

An orthogonal power unit includes blade sections with pressure sensitive elements on either side of a foil contour, such as at the widest point. Vents are positioned rearward of the pressure sensitive elements. A controller, such as a linkage or electronic controller, senses a pressure differential between the pressure sensitive elements. When the pressure differential exceeds a threshold, a valve coupled to the vent on the low-pressure side is opened to release pressurized fluid from that vent. The fluid may be combustible gas and an ignitor may be incorporated into the turbine blade to ignite the gas. A channel may pass through the blade sections and a back-pressure valve in each valve section couples the channel to a cavity from which fluid is released through the vents.

18 Claims, 6 Drawing Sheets

ORTHOGONAL TURBINE WITH PRESSURE-DIFFERENTIAL-CONTROLLED JETS

FIELD OF THE INVENTION

This invention relates to turbines and, more particularly, to orthogonal turbines for use in various applications, such as wind power or hydro power.

BACKGROUND OF THE INVENTION

Harvesting energy from fluid flow (e.g., wind or water) is an ideal way to sustainably produce energy without producing pollution. The most common approach is a large horizontal axis turbine mounted on a large mast with blades projecting outwardly perpendicular to the horizontal axis. A second approach is an orthogonal balanced turbine, in which blades are positioned around the axis of rotation in a helical shape or oriented parallel to the axis of rotation. The axis of rotation of an orthogonal turbine may be oriented horizontally or vertically. Examples of orthogonal turbines are disclosed in U.S. Pat. Nos. 7,741,729, 8,007,235, and 8,047,785.

The apparatus disclosed herein provides an improved approach for implementing an orthogonal turbine.

SUMMARY OF THE INVENTION

In one aspect of the invention, a turbine blade includes a first surface and a second flow surface positioned opposite one another and defining an airfoil contour, the first surface and second surface lying on opposite sides of a chord of the airfoil contour. The turbine blade further includes means for sensing a pressure difference between a first point on the first surface and a second point on the second surface. The turbine blade further includes a fluid (gas or liquid) inlet and a first valve in fluid communication with the fluid inlet. In one embodiment, the first valve is configured to selectively emit air from the gas source over the first surface. A second valve is in fluid communication with the gas inlet and configured to selectively emit air over the second surface. A controller is coupled to the means for sensing the pressure difference. The controller is configured to (a) open the first valve when the means for sensing the pressure difference indicates greater pressure at the second point than at the first point (b) open the second valve when the means for sensing the pressure difference indicates greater pressure at the first point than at the second point.

In some embodiments, the means for sensing the pressure difference includes a first membrane positioned to sense pressure at the first surface and a second membrane positioned to sense pressure at the second surface. In such embodiments, the controller may be a mechanical linkage coupling the first membrane and the second membrane to the first valve and the second valve.

In some embodiments, the means for sensing the pressure difference includes a first electronic pressure sensor positioned to sense pressure at the first surface and a second electronic pressure sensor positioned to sense pressure at the second surface. In such embodiments, the controller is an electronic device coupled to the first electronic pressure sensor and the second electronic pressure sensor.

In some embodiments, the turbine blade includes a channel passing through the turbine blade, a chamber defined within the turbine blade, and a back pressure valve coupling the chamber to the channel.

In some embodiments, the turbine blade includes at least one ignitor positioned to ignite gas passing through at least one of the first valve and the second valve.

In some embodiments, the first point and the second point are at a location of a widest separation between the first surface and the second surface.

In some embodiments, the first valve is in communication with a first vent in the first surface and the second valve is in fluid communication with a second vent in the second surface. The first point is positioned between a leading edge of the airfoil contour and the first vent. The second point is positioned between the leading edge of the airfoil contour and the second vent.

In some embodiments, the first vent and the second vent are offset from the leading edge of the airfoil contour by between 0.6 and 0.7 times a chord length of the airfoil contour.

A power unit (such as a wind turbine or hydro-electric generator) including a blade having sections embodied as the above-described turbine blade is also disclosed and claimed herein. A method of use is also disclosed and claimed herein.

BRIEF DESCRIPTION OF THE DRAWINGS

Preferred and alternative examples of the present invention are described in detail below with reference to the following drawings.

DETAILED DESCRIPTION OF THE PREFERRED EMBODIMENTS

Figure 1:
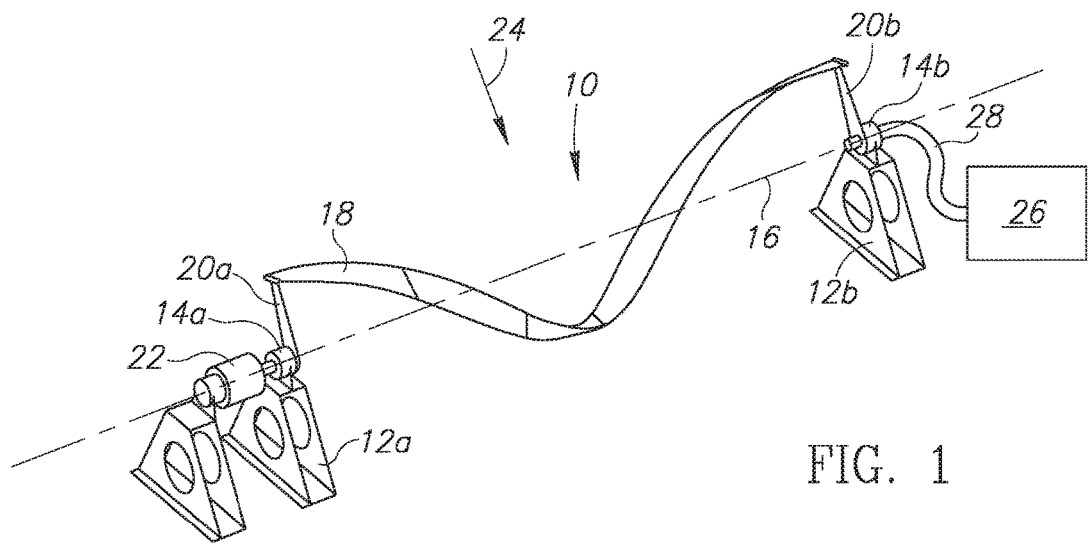
FIG. 1 is an isometric view of a balanced orthogonal turbine in accordance with an embodiment of the present invention.

Referring to FIG. 1, a turbine 10 may include one or more anchors 12a, 12b that support rotary connections 14a, 14b defining an axis of rotation 16. The rotary connections 14a, 14b may comprise a single axle having its ends rotatably mounted to the anchors 12a, 12b by means of rotary bearings. Alternatively, the rotary connections 14a, 14b may each include a separate axle rotatably mounted to a corresponding anchor 12a, 12b using a rotary bearing. In the illustrated embodiment, the axis of rotation 16 is oriented horizontally. However, in other embodiments, the axis of rotation 16 may be oriented vertically. In such embodiments, one of the anchors 12b may be omitted or be mounted at an elevated position relative to the other anchor 12a.

In the illustrated embodiment, a spiral turbine blade 18 is mounted to the rotary connections 14a, 14b by means of arms 20a, 20b. One of the arms 20a is coupled to a generator 22, such that rotation of the turbine blade 18 results in output of current by the generator 22. A flow direction 24 may have at least a component thereof oriented perpendicular to the axis of rotation 16 in order to generate power from the generator 22.

As described in greater detail below, performance of the spiral turbine blade 18 may be enhanced by using compressed or combusted fluid (gas or liquid). Accordingly, a gas source 26 may be in fluid communication with the spiral turbine blade 18. For example, a tube 28 may be coupled to a rotary pneumatic junction coupling the tube 28 to a channel defined in one of the arms 20a, 20b and passing through the spiral turbine blade 18. The gas source 26 may be a compressor or a source of combustible gas, such as gasoline, propane, butane, methane, hydrogen, or other combustible gas.

Figure 2:
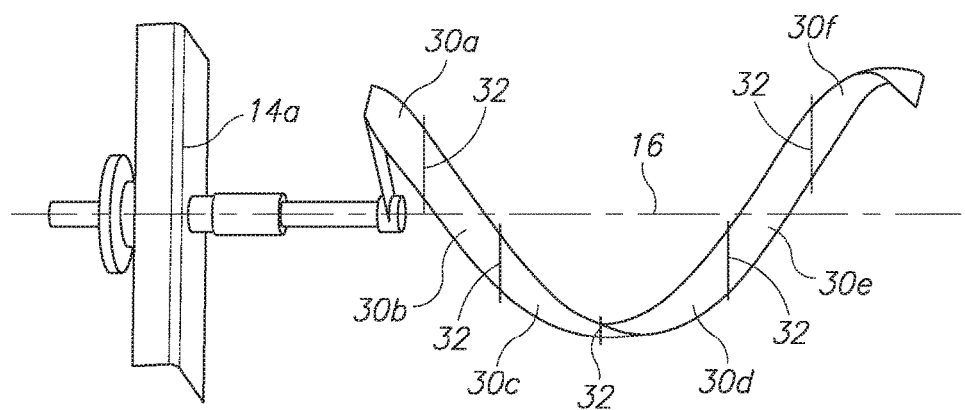
FIG. 2 is another isometric view of the balanced orthogonal turbine in accordance with an embodiment of the present invention.

Referring to FIG. 2, the spiral turbine blade 18 may be defined with respect to a cylinder concentric with the axis of rotation 16. In particular, the helical turbine blade 18 may be shaped such that the chord thereof is shaped like a ribbon wrapped around the cylinder. Stated differently, the chord of the spiral turbine blade 18 along its length may be approximately tangent (e.g. within 1 to 5 degrees from tangent) to a circle centered on the axis of rotation 16 and in a plane perpendicular to the axis of rotation 16.

The spiral turbine blade 18 may be divided into sections 30a-30f. The flow of gas out of each section 30a-30f may be controlled independently in order to compensate for changes in the angle of attack of each section 30a-30f throughout a revolution of the turbine blade 18. In the illustrated embodiments, the turbine blade 18 is sectioned along planes perpendicular to the axis of rotation 16, however other section lines may be used. As described in greater detail below, supplemental fluid flow over the sections 30a-30f is independently controlled. In some embodiments, sections 30a-30f may be isolated from one another, such as by ridges or walls protruding from the blade 18 at the boundary between the sections 30a-30f to inhibit flow (i.e., fluid flow such as airflow or liquid flow) between sections 30a-30f.

Figure 7A:
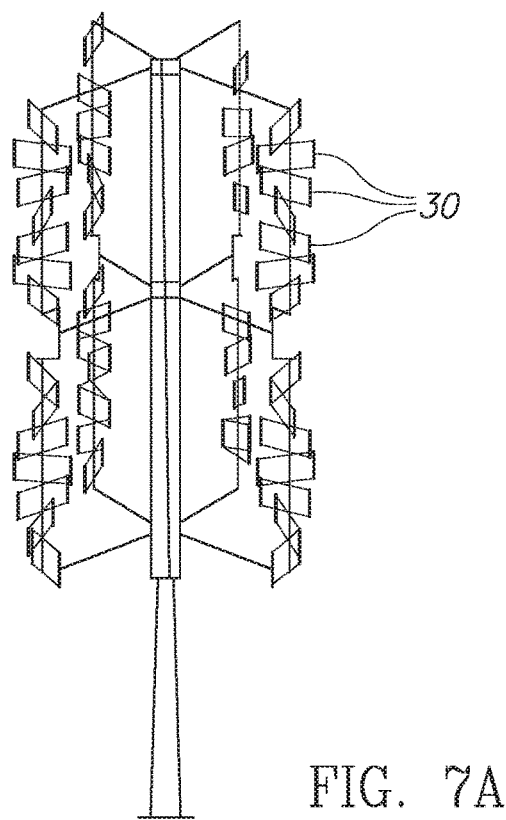
FIGS. 7A through 7C illustrate alternative embodiments in which to practice an approach in accordance with an embodiment of the present invention.
Figure 7B:
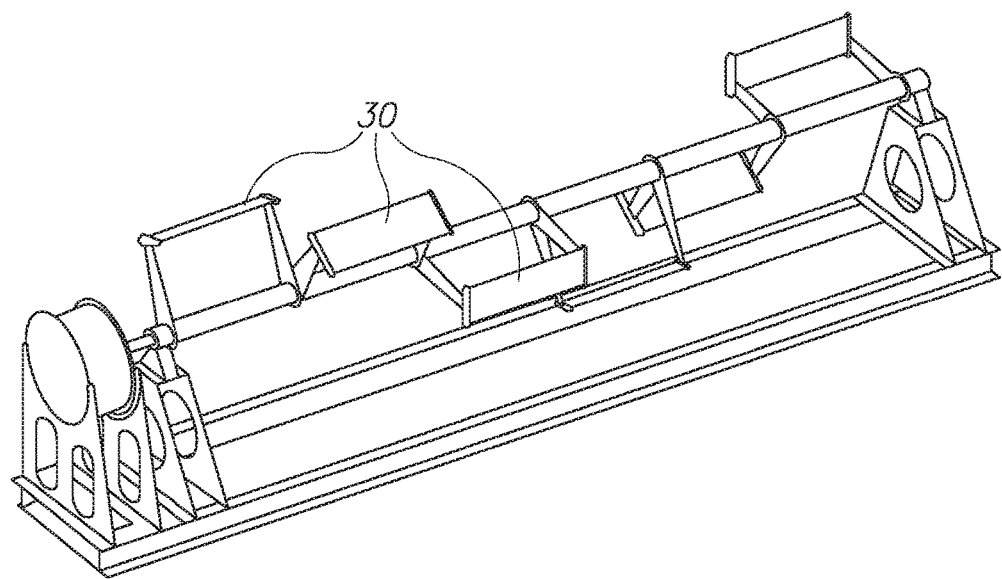
Figure 7C:
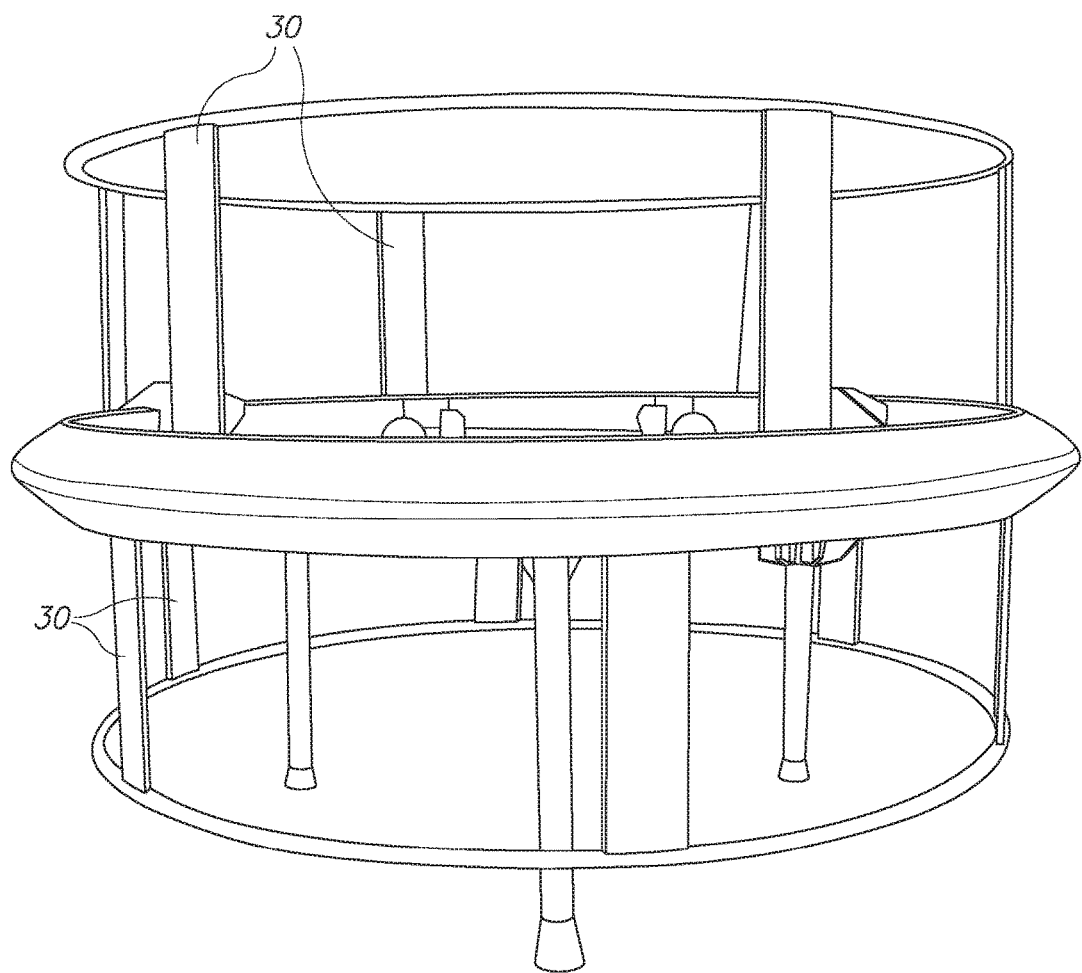

In other embodiments, sections 30a-30f may be actual separate pieces that are not secured to one another. The sections 30a-30f may be arranged in a helical configuration approximating that of FIGS. 1 and 2. Alternatively, the sections 30a-30f may be blades arranged according to any arrangement known in the art of orthogonal turbine design. The independent airflow functionality of the blade sections 30a-30f may be incorporated into the blades 30 of any of the embodiments disclosed in U.S. Pat. No. 7,741,729 (see FIG. 7A), U.S. Pat. No. 8,007,235 (see FIG. 7B), and U.S. Pat. No. 8,047,785 (see FIG. 7C), which are hereby incorporated herein by reference in their entirety. In particular, the blade design and manner of operation described below may be applied to these wind or hydro turbine designs to improve performance.

Figure 3:
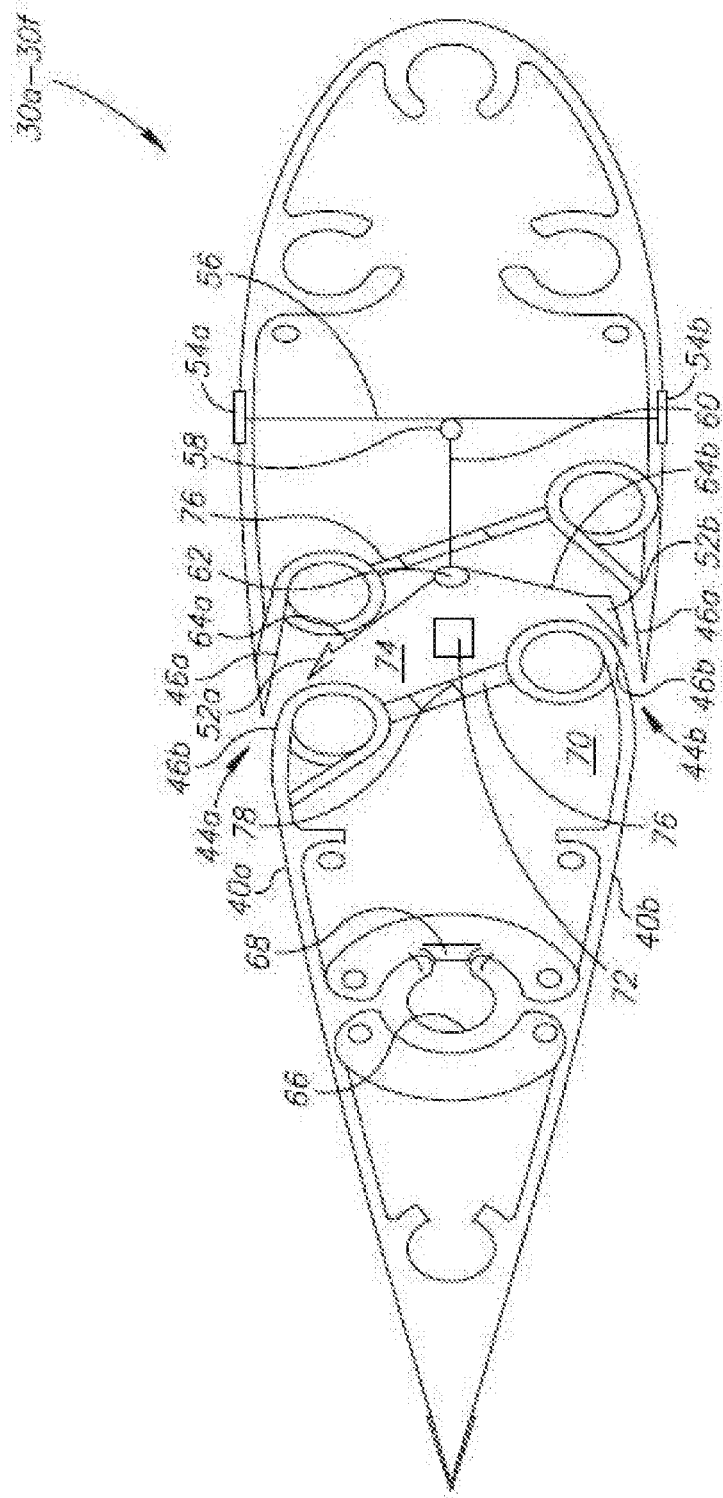
FIG. 3 is a cross-sectional view of a turbine blade for use in the balanced orthogonal turbine in accordance with an embodiment of the present invention.
Figure 4:
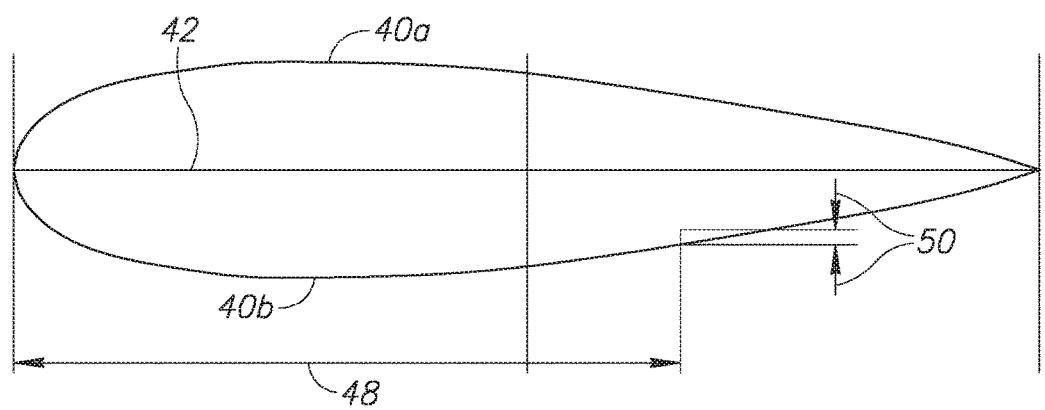
FIG. 4 is a diagram illustrating the relative position of vents on a turbine blade for use in the balanced orthogonal turbine in accordance with an embodiment of the present invention.

Referring to FIGS. 3 and 4, each section 30a-30f may have some or all the attributes of the illustrated section. Each section 30a-30f may include a barrier 32 extending around the section 30a-30f and attached at one end of the section 30a-30f, i.e. at or within 1 cm of an end of the section 30a-30f that abuts an adjacent section 30a-30f. The barrier 32 may be a thin sheet of material, e.g. metal or plastic. In some embodiments, the barrier 32 may be implemented by a sheet of material positioned between sections 30a-30f. The amount by which the barrier 32 protrudes normal to the airfoil contour of the section 30a-30f may be a multiple of the boundary layer thickness at that point on the airfoil contour for a particular flow direction over the section 30a-30f, e.g. an angle of attack of between 0 and 90 degrees. In some embodiments, the height is between one and three times the boundary layer thickness.

As is apparent, the section has upper and lower surfaces 40a, 40b that define an airfoil contour. In particular, upper surface 40a may extend from the leading edge to the trailing edge of the airfoil contour on one side of the chord 42 (FIG. 4) of the airfoil contour and surface 40b may extend from the leading edge to the trailing edge of the airfoil contour on an opposite side of the chord 42. In the illustrated embodiment, the upper and lower surfaces 40a, 40b are mirror images of one another about the chord 42. In some embodiments, the upper and lower surfaces 40a, 40b define a contour corresponding to design parameters of any NACA (National Advisory Committee for Aeronautics) airfoil design suitable for use in a power unit, such as a wind turbine. In other embodiments, such surfaces are optimized for fluid flow in a hydro power unit.

Vents 44a, 44b (FIG. 3) may be formed in the upper and lower surfaces 40a, 40b, respectively. As shown in FIG. 3, vents 44a, 44b may be oriented to direct air toward the trailing edge of the section at an angle close to tangential to the surfaces 40a, 40b. For example, surfaces 46a, 46b within the section may direct air out of the vent 44a, 44a in a stream that is directed between 0 and 10 degrees, preferably zero degrees, from tangential to the airfoil contour defined by the surfaces 40a, 40b at the location of the vent 44a, 44b. The vents 44a, 44b may extend along the entire length of the section, i.e. into the page of FIG. 3 or may be one of a series of vents distributed along the length of the section.

As shown in FIG. 3, the edge of the vents 44a, 44b closest to the leading edge of the airfoil contour may be offset from the leading edge by a distance 48 (see FIG. 4) that is from 0.6 to 0.7 times the chord length of the airfoil contour. For example, in one embodiment, the distance 48 is 0.65. The vents 44a-44b may define an opening having a height 50 perpendicular to the chord 42. The height 50 may be selected based on the pressure of gas emitted through the vents 44a-44b to provide sufficient airflow to achieve performance improvements. The height 50 may be determined by the conditions of use of the blade. For example, height 50 may be selected such that thickness of the jet is less than a local thickness of the boundary layer at a point of exit of the jet from the vent 44a, 44b.

Referring specifically to FIG. 3, air flow through the vents 44a, 44b may be controlled by valves 52a, 52b, respectively. In the illustrated embodiment, opening and closing of the valves 52a, 52b may be controlled by pressure sensitive elements 54a, 54b positioned to sense pressures at the upper and lower surfaces 40a, 40b, respectively. In the illustrated embodiments, the pressure sensitive elements 54a, 54b sense pressure at approximately a thickest point in the airfoil contour, such as within 2% of the chord length of the airfoil contour from the thickest point in the airfoil contour. The thickest point in the airfoil contour may be a point of maximum separation between the upper and lower surfaces 40a, 40b. The thickest point in the airfoil contour also corresponds to the point where pressure on the airfoil contour is lowest. Accordingly, the pressure-sensitive elements may be placed within 2% of the chord length from an experimentally determined location of lowest pressure for a given airfoil contour.

The pressure sensitive elements 54a, 54b are used to improve the effectiveness of the section. In particular, where the pressure at pressure sensitive element 54a is greater than the pressure at pressure sensitive element 54b by some threshold difference, then the valve 52b is opened. Where pressure at pressure sensitive element 54b is greater than the pressure at pressure sensitive element 54a by the threshold difference, then the valve 52a is opened. Accordingly, the valve on the lower-pressure surface 40a, 40b will be opened where the pressure differential exceeds the threshold. Example values for the threshold may be between 8 and 15 percent, preferably 10 percent, of the average velocity head of flow incident on the blade at the location of the pressure sensitive elements 54a, 54b.

In one embodiment, the pressure sensitive elements 54a, 54b are membranes that are either flush with the surfaces 40a, 40b, respectively or connected thereto by a tube or other opening allowing the pressure of air at the surfaces 40a, 40b to reach the membranes. These membranes may be linked to the valves 52a, 52b by a mechanical linkage 56, 58, 60, 62, 64a, 64b. In another embodiment, pressure sensitive elements 54a, 54b are embodied as electronic pressure sensors that are located at the surfaces 40a, 40b or connected to the surfaces 40a, 40b by tubes the pressure sensitive elements 54a, 54b may be electronically coupled to an electronic controller. In such embodiments, the valves 52a, 52b may be electronic valves that are electronically coupled to the electronic controller. The electronic controller that may be programmed to:

1. receive outputs of the pressure-sensitive elements 54a, 54b and computer a difference;
2. compare the difference to a threshold;
3. if the difference exceeds the threshold, open the valve 52a, 52b for which output received at step 1 was lower; and
4. when the pressure differential no longer meets the threshold condition, close the valve opened at step 3.

In yet another embodiment, the pressure sensitive elements 54a, 54b may be embodied as an electronic differential pressure sensor coupled by tubes to the air flow at the upper and lower surfaces 40a, 40b at the locations described above for pressure sensitive elements 54a, 54b. A controller may be coupled to the electronic differential pressure sensor and be programmed to:

1. Receive an output of the electronic differential pressure sensor;
2. Compare the magnitude of the output, such as a filtered version of the output, to a threshold;
3. If the magnitude of the output exceeds the threshold, open one of the valves 52a, 52b if the output is positive and open the other of the valves 52a, 52b if the output is negative such that the valve that is opened is on the lower pressure side; and
4. When the magnitude of the output no longer exceeds the threshold, close the valve opened at step 3.

In such embodiments, the valve 52a, 52b is selected based on the sign of the output of the electronic differential pressure sensor such that the valve 52a, 52b on the lower-pressure side 40a, 40b is opened when the magnitude exceeds the threshold condition.

In the illustrated embodiment, gas for release through the valves 52a, 52b may be provided to each section 30a-30f through a channel 66. The channel 66 may pass completely through each section 30a-30f such that each section is coupled to the channel 66 of at least one adjacent section 30a-30f. A section 30a-30f at the end of the helical blade 18 may then be coupled to the gas source as 26 as described above with respect to FIG. 1. The channel of the section 30a-30f opposite the one connected to the gas source may be sealed at its exposed end to prevent the escape of gas.

The channel 66 may be connected by a backpressure valve 68 to a chamber 70 within the section 30a-30f. The valves 52a, 52b are likewise in fluid communication with the chamber 70. The backpressure valve 68 allows gas to flow from the channel 66 into the LOWE GRAHAM ONES chamber 70 until the pressure in the chamber exceeds a set pressure, at which point the backpressure valve 68 will close.

As noted above, in some embodiments, the gas source 26 may be a combustible gas source. In such embodiments, each section 30a-30f may include one or more ignitors 72, such as a spark plug. In the illustrated embodiment, an ignitor 72 is positioned within the chamber 70. In some embodiments, an ignitor is provided for each pair of vents 44a, 44b and there may be multiple pairs of valves vents 44a, 44b. In other embodiments, each vent 44a, 44b has a corresponding ignitor positioned to ignite gas prior to the gas exiting through the vent 44a, 44b.

In the illustrated embodiment, the ignitor 72 is positioned within a sub-chamber 74 of the chamber 70, defined by walls 76 partially isolating the sub-chamber from the chamber 70 such that gas may pass from the chamber 70 into the sub-chamber 74 through an opening 78 in one of the walls 76. This may enable control of combustion of gas emitted through the vents 44a, 44b.

In some embodiments, the one or more ignitors 72 are coupled to the electronic controller of any of the electronically controlled embodiments described above. In such embodiments, the controller may be further programmed to activate the upon opening of one of the valves 52a, 52b in order to ignite the combustible gas. The ignitor 72 may continue to be activated while the valve 52a, 52b is open or only once just prior or just after opening (e.g. within 0.2 seconds of opening)

The sections 30a-30f configured as described above with respect to FIG. 4 operate to increase circulation around the sections and, therefore, increase lifting and pulling forces operating on the sections 30a-30f from wind or water flow over the power unit 10, which results in increased torque at the generator 22 or other load driven by the power unit 10. Reaction forces from the impulse of gas (or other fluid) exiting the vents 44a, 44b also creates torque thereby accelerating rotation of the helical blade 18.

As the helical blade 18 moves around the axis of rotation 16, sections 30a-30f at their forward-most and rearward-most are located in a zone of elevated pressure. A stream of gas from the vents 44a, 44b as described above will flow along different sides of the section 30a 30f in which the vents 44a, 44b are formed and will have the effect of increasing torque on the helical blade 18.

For a helical blade with a chord length b=200 mm in a uniform stationary stream of air, two-dimensional conditions at a point 0.3b from the leading fluctuate due to rotation about the axis of rotation 16 with a frequency f such that the angle of attack changes according to (1):

$$\alpha = 14.5° \; \text{Sin}(2\pi((f*t), 0.15 \; s^{-1} < f < 2.9 \; s^{-1} \tag{1}$$

In experiments conducted by the inventor, airstream speed was U=5 m/s such that Strukhal's number of Sh=f*b/U changed from 0.01 to 0.15. Stream thickness (vent height 50) was set to a=0.83 mm.

The relative impulse of the blown jet is characterized by (2).

$$C_s = (V/U)^2 a/b, \tag{2}$$

where V is the expiration speed of the jet and U is the speed of gas flowing over the blade (airstream speed). Experiments conducted by the inventor have shown that, for locations along the helical blade 18 at large angles of attack relative to the wind, providing a stream of air according to the approach described above increases the pulling force at these locations by almost a factor of three even at small values of an impulse of a stream $C_s=0.085$.

Figure 5:
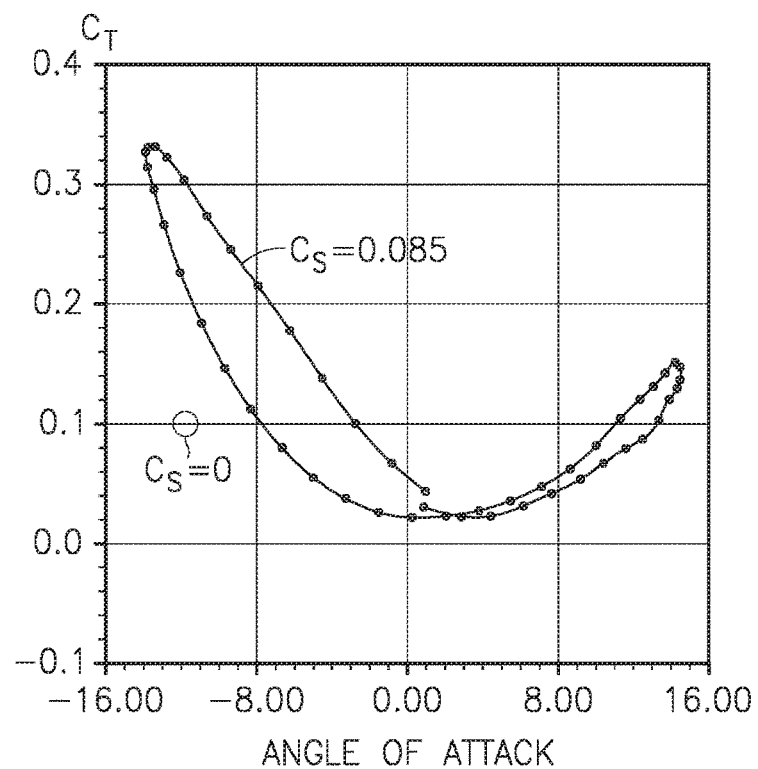
FIG. 5 is a plot of coefficient of pulling force with respect to angle of attack for a turbine blade at low frequencies in accordance with an embodiment of the present invention.
Figure 6:
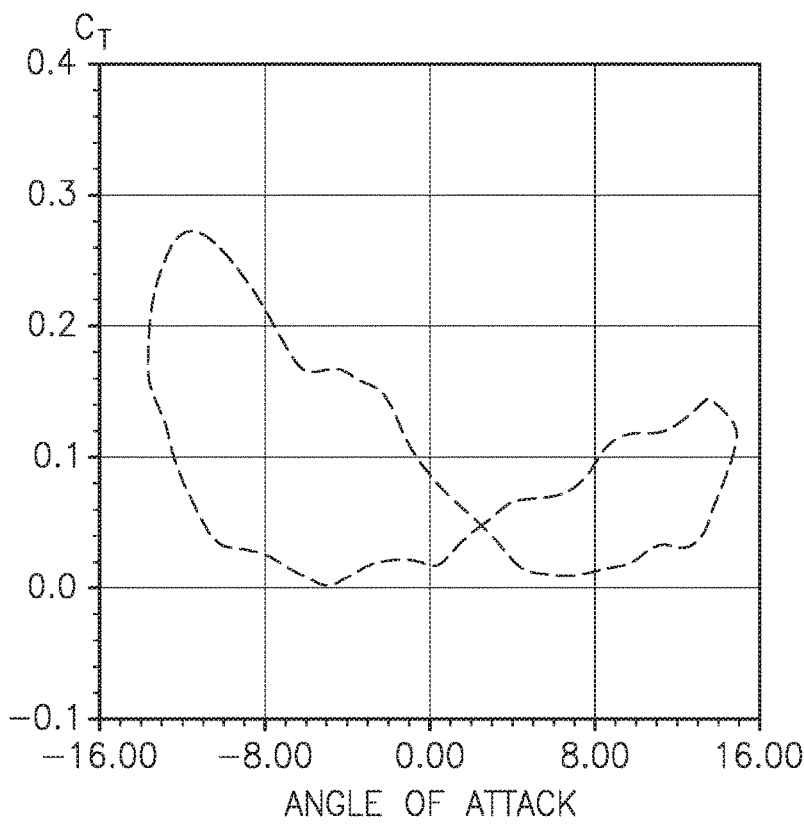
FIG. 6 is a plot of coefficient of pulling force with respect to angle of attack for a turbine blade at low frequencies in accordance with an embodiment of the present invention.

FIG. 5 is a plot of $C_T$ (vertical axis) with respect to angle of attack (horizontal axis) for a complete revolution of the blade 18 at a non-dimensional frequency of rotation of 0.006, where the non-dimensional frequency of rotation is calculated as fb/U, with fb as the frequency of rotation of the blade with chord b. FIG. 6 is a plot of $C_T$ with respect to angle of attack for a complete revolution of the blade 18 at a non-dimensional frequency of rotation of 0.113. The loop in drawings answers the direction of change of an angle of attack on the right. As shown in FIGS. 5 and 6, for slow changes of an angle of attack the effect of emitting gas from the valves 44a, 44b is highly effective at increasing $C_T$ for a wide range of angles of attack.

For large positive angles of attack, the impact of using jets of air is minimal. In particular, for positive angle attack increase in efficiency is achieved by directing a jet of air over the higher pressure side. However, in some embodiments, this functionality is not implemented.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A turbine blade comprising:
    a first surface and a second surface positioned opposite one another and defining a foil contour, the first surface and second surface lying on opposite sides of a chord of the foil contour, the first surface having a first vent that is oriented to direct fluid over the first surface at a first angle between 0 and 10 degrees of tangential to the first surface, and the second surface having a second vent that is oriented to direct fluid over the second surface at a second angle between 0 and 10 degrees of tangential to the second surface, wherein the first vent and the second vent are offset from a leading edge of the foil contour by between 0.6 and 0.7 times a chord length of the foil contour;
    means for sensing a pressure difference between a first point on the first surface and a second point on the second surface;
    a fluid inlet;
    a first valve in fluid communication with the fluid inlet and configured to selectively emit fluid through the first vent over the first surface;
    a second valve in fluid communication with the fluid inlet and configured to selectively emit fluid through the second vent over the second surface; and
    a controller coupled to the means for sensing the pressure difference and configured to (a) open the first valve when the means for sensing the pressure difference indicates greater pressure at the second point than at the first point and (b) open the second valve when the means for sensing the pressure difference indicates greater pressure at the first point than at the second point.

2. The turbine blade of claim 1, wherein:
    the means for sensing the pressure difference comprises a first membrane positioned to sense pressure at the first surface and a second membrane positioned to sense pressure at the second surface; and
    the controller is a mechanical linkage coupling the first membrane and the second membrane to the first valve and the second valve.

3. The turbine blade of claim 1, wherein:
    the means for sensing the pressure difference comprises a first electronic pressure sensor positioned to sense pressure at the first surface and a second electronic pressure sensor positioned to sense pressure at the second surface; and
    the controller is an electronic device coupled to the first electronic pressure sensor and the second electronic pressure sensor.

4. The turbine blade of claim 1, further comprising:
    a channel passing through the turbine blade;
    a chamber defined within the turbine blade; and
    a back-pressure valve coupling the chamber to the channel.

5. The turbine blade of claim 1, further comprising at least one ignitor positioned to ignite gas passing through at least one of the first valve and the second valve.

6. The turbine blade of claim 1, wherein the first point and the second point are at a location of a widest separation between the first surface and the second surface.

7. The turbine blade of claim 6, wherein the first point is positioned between the leading edge of the foil contour and the first vent, and the second point is positioned between the leading edge of the foil contour and the second vent.

8. A power unit comprising:
    a mount defining a rotatable attachment point rotatable relative to the mount about an axis of rotation;
    one or more blades, each blade of the one or more blades mounted to the rotatable attachment point and having a chord substantially tangent to a cylinder having an axis of symmetry centered on the axis of rotation; and
    a gas source;
    wherein each blade of the one or more blades comprises:
        a first pressure sensitive element on a first side of the each blade;
        a second pressure sensitive element on a second side of the each blade, the chord of the each blade being positioned between the first side and the second side, wherein the first pressure sensitive element and the second pressure sensitive element are positioned approximately at a point of widest separation between the first side and the second side;
        a first vent disposed in the first surface of the each blade;
        a second vent disposed in the second surface of the each blade, wherein the first vent and the second vent are offset from a leading edge of the foil contour of the each blade by between 0.6 and 0.7 times a chord length of the foil contour of the each blade;
        a first valve in fluid communication with the gas source and configured to selectively emit air from the gas source through the first vent over the first side of the each blade;
        a second valve in fluid communication with the gas source and configured to selectively emit air through the second vent over the second side of the each blade; and
        a controller coupled to the first pressure sensitive element and the second pressure sensitive element, the controller configured to (a) open the first valve when there is greater pressure on the second pressure sensitive element than on the first pressure sensitive element and (b) open the second valve when there is greater pressure on the first pressure sensitive element than on the second pressure sensitive element.

9. The power unit of claim 8, wherein:
the first pressure sensitive element is a first membrane and the second pressure sensitive element is a second membrane; and
the controller is a mechanical linkage coupling the first membrane and the second membrane to the first valve and the second valve.

10. The power unit of claim 8, wherein:
the first pressure sensitive element is a first electronic pressure sensor and the second pressure sensitive element is a second electronic pressure sensor; and
the controller is an electronic device coupled to the first electronic pressure sensor and the second electronic pressure sensor.

11. The power unit of claim 8, wherein the one or more blades are one or more helical blades.

12. The power unit of claim 8, wherein the one or more blades comprise a plurality of blades and each blade the one or more blades is a section of a single helical blade.

13. The power unit of claim 12, wherein:
each blade of the plurality of blades defines a channel, the channels of the plurality of blades defining a fluid path through the single helical blade that is coupled to the gas source;
each blade of the plurality of blades defines a chamber in fluid communication with the first valve and the second valve and comprises a back-pressure valve coupling the chamber to the channel of the each blade.

14. The power unit of claim 8, wherein the gas source is a pressurized gas source.

15. The power unit of claim 8, wherein the gas source is a combustible gas source.

16. The power unit of claim 15, wherein each blade further comprises at least one ignitor positioned to ignite gas passing through at least one of the first valve and the second valve.

17. The power unit of claim 8, wherein:
the first pressure sensitive element is positioned between a leading edge of the each blade and the first vent, and the second pressure sensitive element is positioned between the leading edge of the each blade and the second vent; and
the first vent and the second vent are offset from the leading edge of the each blade by between 0.6 and 0.7 times a chord length of the each blade.

18. A method comprising:
providing a power unit comprising a plurality of blade sections arranged around an axis of rotation; and
for each blade section of the plurality of blade sections—
detecting with a first pressure sensitive element and a second pressure sensitive element a pressure differential between a first side of a chord of the blade section and a second side of the chord of the blade section that exceeds a threshold differential, the first pressure element being positioned on the first side of the blade, the second pressure element being positioned on the second side of the blade, and the first pressure sensitive element and the second pressure sensitive element being positioned approximately at a point of widest separation between the first side and the second side; and
in response to detecting the pressure differential, emitting air over a lower-pressure side of the first side and the second side through a first vent or a second vent, the first vent being on the first side and being oriented to direct the air over a first surface of the first side at a first angle between 0 and 10 degrees of tangential to the first surface, the second vent being on the second side and being oriented to direct the air over a second surface of the second side at a second angle between 0 and 10 degrees of tangential to the second surface; and
wherein emitting air over the low-pressure side is performed independently for each blade section of the plurality of blade sections.

* * * * *